(12) United States Patent
Takamizawa

(10) Patent No.: US 10,673,314 B2
(45) Date of Patent: Jun. 2, 2020

(54) MOTOR CONFIGURATION SELECTION DEVICE, MOTOR CONFIGURATION SELECTION METHOD, AND NON-TRANSITORY COMPUTER-READABLE MEDIUM STORING PROGRAM

(71) Applicant: FANUC CORPORATION, Yamanashi (JP)

(72) Inventor: Suguru Takamizawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 135 days.

(21) Appl. No.: 16/114,055

(22) Filed: Aug. 27, 2018

(65) Prior Publication Data
US 2019/0097514 A1    Mar. 28, 2019

(30) Foreign Application Priority Data
Sep. 22, 2017    (JP) .................... 2017-182681

(51) Int. Cl.
*H02K 41/03*    (2006.01)
*H02P 1/00*    (2006.01)
*H02P 25/06*    (2016.01)

(52) U.S. Cl.
CPC ............. *H02K 41/031* (2013.01); *H02P 1/00* (2013.01); *H02P 25/06* (2013.01); *H02K 2213/03* (2013.01)

(58) Field of Classification Search
CPC .. H02P 25/00; H02P 25/06; H02P 1/00; H02P 29/00; H02K 41/00; H02K 41/03; H02K 41/031; G06F 17/00; G06F 17/50; B60L 13/00; B60L 13/03; B60L 13/04; B60L 13/06; B60L 15/00; B60L 15/005
See application file for complete search history.

(56) References Cited

U.S. PATENT DOCUMENTS 5,218,277 A * 6/1993 Pattison .............. B60L 13/03
318/135

FOREIGN PATENT DOCUMENTS

| JP | H02-219455 A | 9/1990 |
|---|---|---|
| JP | 2003-219628 A | 7/2003 |
| JP | 2007-011455 A | 1/2007 |
| JP | 2012-135070 A | 7/2012 |
| JP | 2012-231552 A | 11/2012 |
| JP | 2013-119295 A | 6/2013 |
| WO | 2013/014780 A1 | 1/2013 |

OTHER PUBLICATIONS

An Office Action mailed by the Japanese Patent Office dated Jun. 25, 2019, which corresponds to Japanese Patent Application No. 2017-182681 and is related to U.S. Appl. No. 16/114,055; with English language translation.

* cited by examiner

*Primary Examiner* — Tran N Nguyen
(74) *Attorney, Agent, or Firm* — Studebaker & Brackett PC

(57) ABSTRACT

To select the configuration of a linear motor more appropriately. A motor configuration selection device according to the present invention comprises a characteristic calculation unit that calculates at least one of force and magnetic attraction to be achieved by a component of a linear motor based on a gap between a field magnet and an armature in the linear motor to be selected.

8 Claims, 8 Drawing Sheets

- ARRANGEMENT CONDITION □ SERIAL □ PARALLEL
- DRIVING VOLTAGE ☐
- MOVEMENT DIRECTION □ HORIZONTAL □ VERTICAL □ TILT

MACHINE CONDITION

| ITEM | NUMERICAL VALUE |
|---|---|
| WEIGHT OF MOVING OBJECT | |
| FRICTION LOAD | |
| FRICTION COEFFICIENT | |

MOTOR ATTRIBUTE

| ITEM | DISPLAY FIELD |
|---|---|
| MODEL NAME | |
| SPECIFICATIONS | |
| COOLING SYSTEM | |
| ACCESSORY PART | |

| ITEM | NUMERICAL VALUE |
|---|---|
| FIELD MAGNET TO ARMATURE GAP | |

STROKE INFORMATION

| ITEM | NUMERICAL VALUE |
|---|---|
| EFFECTIVE STROKE | |
| FIELD MAGNET TRACK LENGTH | |

| FIELD MAGNET SPECIFICATIONS | NUMBER OF FIELD MAGNETS |
|---|---|
| $a_{M1}$ | |
| $a_{M2}$ | |
| ⋮ | |

OPERATION PATTERN

| OPERATION | INPUT FIELD |
|---|---|
| | |
| | |
| | |

FIG. 3

| MODEL NAME | SPECIFICATIONS (MODEL NUMBER) | MAGNETIC ATTRACTION CORRESPONDING TO GAP x | | |
|---|---|---|---|---|
| | | $x_1$ | $x_2$ | ... |
| a | $a_{C1}$ | ... | ... | ... |
| | $a_{C2}$ | | | |
| | ⋮ | | | |
| | ⋮ | | | |
| | ⋮ | | | |
| | ⋮ | | | |
| | ⋮ | | | |
| | ⋮ | | | |
| | ⋮ | | | |
| b | ⋮ | | | |
| ⋮ | ⋮ | | | |

MOTOR CONFIGURATION SELECTION DEVICE, MOTOR CONFIGURATION SELECTION METHOD, AND NON-TRANSITORY COMPUTER-READABLE MEDIUM STORING PROGRAM

This application is based on and claims the benefit of priority from Japanese Patent Application No. 2017-182681, filed on 22 Sep. 2017, the content of which is incorporated herein by reference.

BACKGROUND OF THE INVENTION

Field of the Invention

The present invention relates to a motor configuration selection device, a motor configuration selection method, and a non-transitory computer-readable medium storing a program.

Related Art

For conventional selection of the configuration of a linear motor, to conform to required specifications, etc., a combination of components to be used has been determined such as the lengths of field magnets for generating a magnetic field or the number of the field magnets, for example. A technique of selecting the configuration of a linear motor is described in Patent Document 1, for example.

Patent Document 1: PCT International Publication No. WO2013/014780

SUMMARY OF THE INVENTION

Even if a combination of components to be used has been determined such as the lengths of field magnets or the number of the field magnets so as to conform to required specifications, etc., however, intended force or magnetic attraction has not always been achieved in an actually assembled linear motor.

The present invention is intended to select the configuration of a linear motor more appropriately.

(1) A motor configuration selection device according to the present invention (motor configuration selection device 1 described later, for example) comprises a characteristic calculation unit (gap-dependent parameter component acquisition unit 11c, current-dependent parameter component acquisition unit 11d, total parameter acquisition unit 11e described later, for example) that calculates at least one of force and magnetic attraction to be achieved by a component as a candidate for selection in a linear motor based on a gap G between a field magnet (field magnet 22 described later, for example) and an armature (armature 32 described later, for example) in the linear motor to be selected.

(2) The motor configuration selection device described in (1) may comprise: a compatibility condition setting unit (condition setting unit 11b described later, for example) that sets a compatibility condition including at least one of required force and required magnetic attraction in the linear motor; and a condition determination unit (selection processing unit 11f described later, for example) that determines the compatibility or incompatibility of at least one of the force and the magnetic attraction calculated by the characteristic calculation unit based on the compatibility condition set by the compatibility condition setting unit.

(3) In the motor configuration selection device described in (1) or (2), the characteristic calculation unit may calculate at least one of the force and the magnetic attraction to be achieved by the component as the candidate for selection in the linear motor based on the gap between the field magnet and the armature in the linear motor to be selected and a current in the linear motor to be selected.

(4) In the motor configuration selection device described in (1) to (3), the characteristic calculation unit may calculate the force or the magnetic attraction to be achieved by the component as the candidate for selection in the linear motor based on an approximate expression for approximating force corresponding to the gap between the field magnet and the armature in the linear motor to be selected, or an approximate expression for approximating magnetic attraction corresponding to the gap between the field magnet and the armature in the linear motor to be selected.

(5) In the motor configuration selection device described in (4), the characteristic calculation unit may generate the approximate expression for approximating the force or the approximate expression for approximating the magnetic attraction based on a representative value about the force or the magnetic attraction corresponding to the gap between the field magnet and the armature in the linear motor to be selected.

(6) In the motor configuration selection device described in (1) to (5), the characteristic calculation unit may have an option between a first approximate expression and a second approximate expression. The first approximate expression is held in association with a representative value about force or magnetic attraction corresponding to the gap between the field magnet and the armature in the linear motor to be selected. The second approximate expression is an approximate expression for approximating force or magnetic attraction corresponding to the gap between the field magnet and the armature in the linear motor to be selected and is generated based on a representative value about the force or the magnetic attraction. The characteristic calculation unit may select one of the first approximate expression and the second approximate expression based on approximation accuracy, a factor as calculation load, and a weight given in advance to the factor, and calculate the force or the magnetic attraction.

(7) A motor configuration selection method according to the present invention comprises a characteristic calculation step of calculating at least one of force and magnetic attraction to be achieved by a component as a candidate for selection in a linear motor based on a gap between a field magnet and an armature in the linear motor to be selected.

(8) A non-transitory computer-readable medium storing a program according to the present invention causes a computer to fulfill a characteristic calculation function of calculating at least one of force and magnetic attraction to be achieved by a component as a candidate for selection in a linear motor based on a gap between a field magnet and an armature in the linear motor to be selected.

The present invention is capable of selecting the configuration of a linear motor more appropriately.

BRIEF DESCRIPTION OF THE DRAWINGS

FIG. 3 is a schematic view showing an example of a condition setting screen;

DETAILED DESCRIPTION OF THE INVENTION

Figure 1:
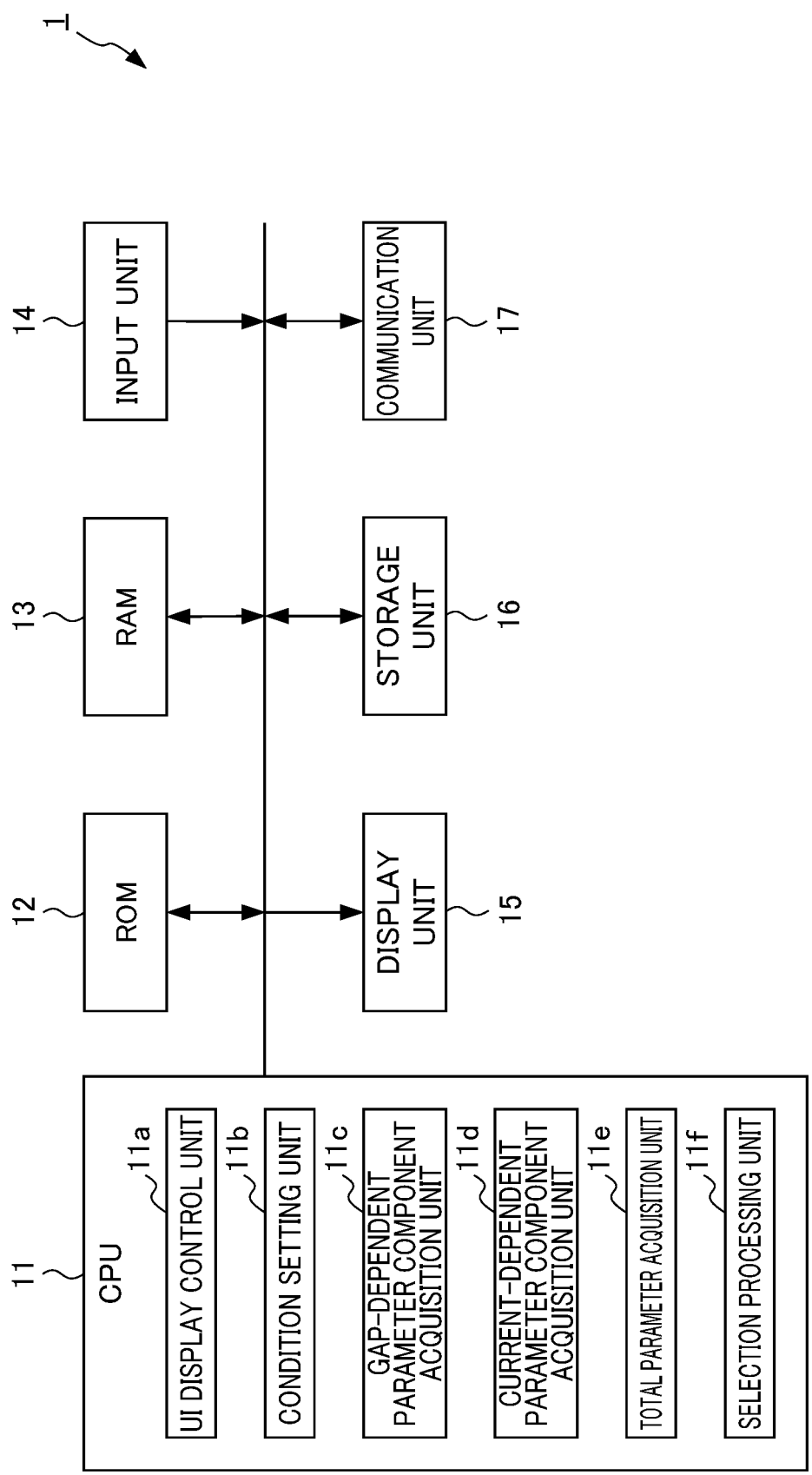
FIG. 1 is a block diagram showing the configuration of a motor configuration selection device according to an embodiment of the present invention.

An embodiment of the present invention will be described below by referring to the drawings.

Configuration

FIG. 1 is a block diagram showing the configuration of a motor configuration selection device 1 according to an embodiment of the present invention. As shown in FIG. 1, the motor configuration selection device 1 includes a central processing unit (CPU) 11, a ROM 12, a RAM 13, an input unit 14, a display unit 15, a storage unit 16, and a communication unit 17.

Figure 2:
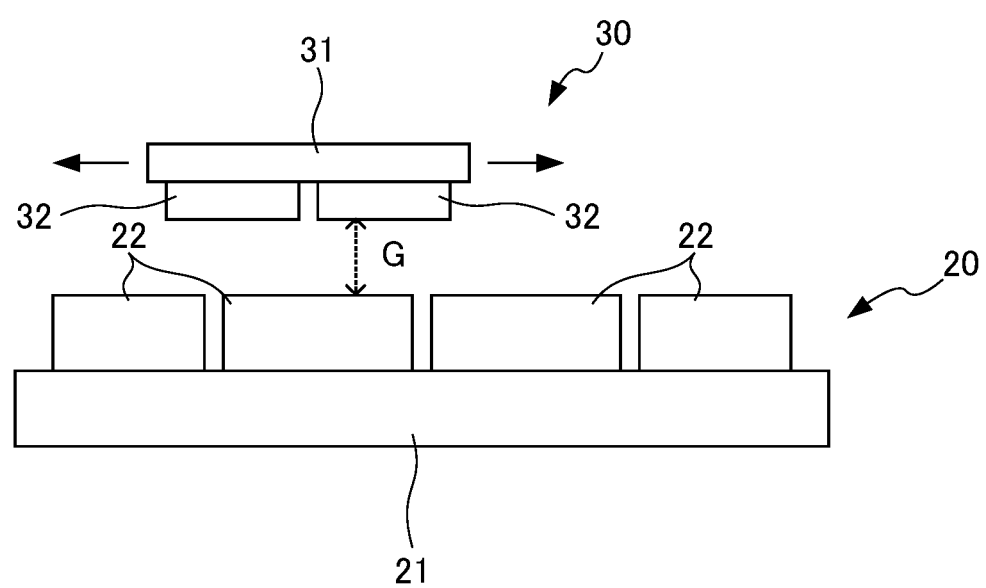
FIG. 2 is a schematic view showing the configuration of a linear motor to be selected by the motor configuration selection device.

FIG. 2 is a schematic view showing the configuration of a linear motor to be selected by the motor configuration selection device 1. As shown in FIG. 2, a linear motor to be selected by the motor configuration selection device 1 may include a field magnet unit 20 in which field magnets 22 are arranged at a machine base 21, and an armature unit 30 in which armatures 32 are arranged at an armature base 31. In the following description, a distance between the field magnet 22 and the armature 32 in the linear motor is also called a "gap G."

Referring to FIG. 1, the CPU 11 executes various types of programs stored in the storage unit 16 to control the motor configuration selection device 1 entirely. For example, the CPU 11 executes a program for implementation of processing of selecting the configuration of a linear motor (hereinafter also called "motor configuration selection processing"). By execution of the program for implementation of the motor configuration selection processing, the following functional structures are formed in the CPU 11: a UI display control unit 11a, a condition setting unit 11b (compatibility condition setting unit), a gap-dependent parameter component acquisition unit 11c (characteristic calculation unit), a current-dependent parameter component acquisition unit 11d (characteristic calculation unit), a total parameter acquisition unit 11e (characteristic calculation unit), and a selection processing unit 11f (condition determination unit). For implementation of the motor configuration selection processing, the motor configuration selection device 1 can acquire information appropriately by accessing a model information DB (not shown in the drawings) containing various types of information including the model number or cost of a component (field magnet or armature, for example) to form a model for a linear motor.

The UI display control unit 11a displays a user interface screen (UI screen) for causing a user to input and output various types of information in the motor configuration selection processing. For example, the UI display control unit 11a displays an input screen (condition setting screen) for input of a condition about a linear motor as a target of selection of a configuration, a screen showing a selection result about a linear motor (selection result display screen), etc.

The condition setting unit 11b sets a condition about a linear motor as a target of selection of a configuration in the motor configuration selection processing. For example, the condition setting unit 11b sets various types of parameters indicating conditions such as maximum required force, rated force, a gap, a driving voltage, motor arrangement, and a machine condition in response to input by a user.

FIG. 3 is a schematic view showing an example of the condition setting screen. Referring to FIG. 3, the condition setting unit 11b accepts input of various types of parameters for selection of a linear motor to the condition setting screen displayed by the UI display control unit 11a. In the illustration of FIG. 3, the condition setting unit 11b accepts input of the following parameters in a parameter group A: parameters about a condition for arrangement of a linear motor (serial or parallel), a movement direction (horizontal, vertical, or tilt), and a driving voltage (200[V] or 400[V]). The condition setting unit 11b accepts input of parameters about machine conditions (weight of moving object, friction load, and friction coefficient) in a parameter group B. The condition setting unit 11b accepts input of parameters about motor attributes (model name, specifications, cooling system, accessory part, and gap (field magnet to armature gap)) in a parameter group C. The condition setting unit 11b accepts input of parameters about stroke information (effective stroke and field magnet track length, or field magnet specifications) in a parameter group D. The condition setting unit 11b accepts input of parameters about an operation pattern (acceleration, equal speed, or duration of operation such as cutting in seconds) in a parameter group E. The condition setting unit 11b sets various types of accepted parameters as parameters for selection of a linear motor.

The gap-dependent parameter component acquisition unit 11c acquires a parameter component to be changed by change in a gap in a liner motor (hereinafter also called a "gap-dependent parameter component," if appropriate). In this embodiment, the gap-dependent parameter component acquisition unit 11c acquires magnetic attraction F1 and force f1 in the armature unit as gap-dependent parameter components that are to change in response to a gap.

Figures 4A, 4B:
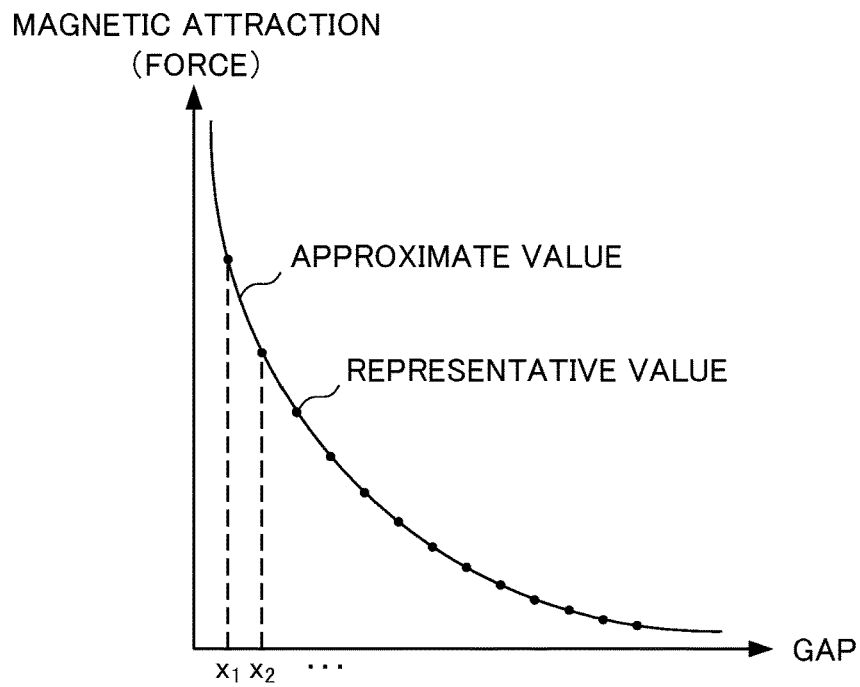
FIG. 4A is a schematic view showing a magnetic attraction data table containing data about a gap and data about magnetic attraction F1 in association with each other.
FIG. 4B is a schematic view showing how an approximate expression is generated based on a representative value.

FIG. 4A is a schematic view showing a magnetic attraction data table containing data about a gap and data about the magnetic attraction F1 in association with each other. As shown in FIG. 4A, the magnetic attraction data table contains data about the magnetic attraction F1 corresponding to a representative gap value ($x_1$ to $x_m$) prepared for each of multiple specifications ($a_{c1}$, $a_{c2}$, . . . ) of each of multiple models (a, b, . . . ) for a motor. In this embodiment, stored data about the magnetic attraction F1 is a ratio of magnetic attraction corresponding to each gap relative to magnetic attraction corresponding to a reference gap (hereinafter also called a "magnetic attraction ratio"). Alternatively, stored data about the magnetic attraction F1 may be the absolute value of magnetic attraction.

Referring to FIG. 4A, stored data is only about the magnetic attraction F1 corresponding to a representative gap value (representative value). Thus, if a value input as a gap is other than a representative gap value, the gap-dependent parameter component acquisition unit 11*c* generates an approximate expression for approximating the magnetic attraction F1 corresponding to a gap using an estimation method such as the least-squares method, and acquires data about the magnetic attraction F1 corresponding to the input gap using the generated approximate expression.

FIG. 4B is a schematic view showing how an approximate expression is generated based on a representative value. As shown in FIG. 4B, if the characteristics of the magnetic attraction F1 can be approximated entirely using one approximate expression, the gap-dependent parameter component acquisition unit 11*c* acquires data about the magnetic attraction F1 corresponding to an input gap using this approximate expression. If the characteristics of the magnetic attraction F1 can be approximated using an approximate expression prepared for each section, the gap-dependent parameter component acquisition unit 11*c* acquires data about the magnetic attraction F1 corresponding to an input gap using the approximate expression prepared for each section. If the characteristics of the magnetic attraction F1 cannot be approximated using an approximate expression prepared for each section, the gap-dependent parameter component acquisition unit 11*c* acquires data about the magnetic attraction F1 corresponding to an input gap by linear interpolation or curve interpolation using data about the magnetic attraction F1 corresponding to two representative values with respect to an input gap as an intermediate.

The gap-dependent parameter component acquisition unit 11*c* acquires data about the magnetic attraction F1 corresponding to a gap input by a user using the magnetic attraction data table or an approximate expression for approximating the magnetic attraction F1. Regarding force, the gap-dependent parameter component acquisition unit 11*c* acquires data about the force f1 in the same way as that for acquiring data about magnetic attraction.

The current-dependent parameter component acquisition unit 11*d* acquires a parameter component to be changed by change in a driving current in a liner motor (hereinafter also called a "current-dependent parameter component," if appropriate). In this embodiment, the current-dependent parameter component acquisition unit 11*d* acquires magnetic attraction F2 and force f2 in the armature unit as current-dependent parameter components that are to change in response to a driving current in a linear motor.

Figure 5:
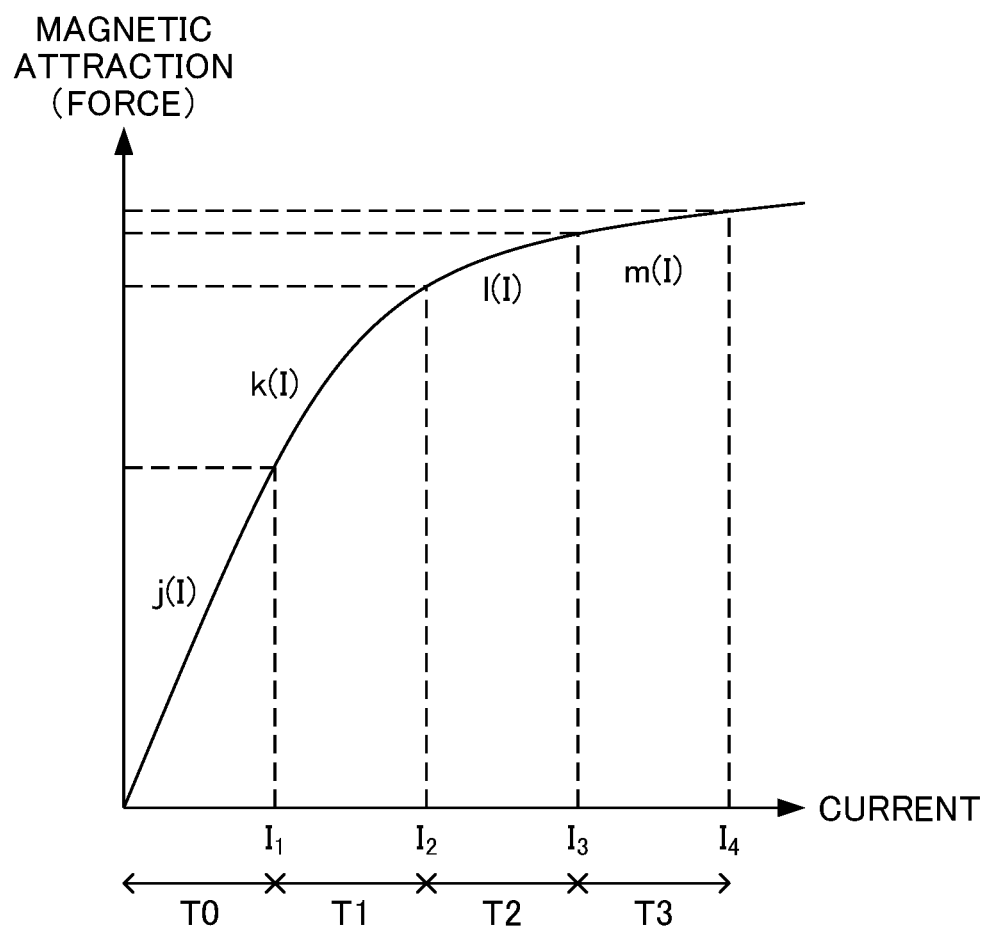
FIG. 5 is a schematic view showing a relationship of magnetic attraction F2 with a driving current I.

FIG. 5 is a schematic view showing a relationship of the magnetic attraction F2 with a driving current I. The characteristics in FIG. 5 show a relationship between the driving current I and the magnetic attraction F2 corresponding to a rated gap (gap reference value). As shown in FIG. 5, the characteristics of the magnetic attraction F2 corresponding to the driving current I differ between sections. In a range where the driving current I is from zero to a low-current value (section T0), the magnetic attraction F2 takes on characteristics similar to those of a linear function. In each of a section T1, a section T2, and a section T3 where the driving current I is higher than that in the section T0, the magnetic attraction F2 takes on characteristics of increasing non-linearly. Thus, the current-dependent parameter component acquisition unit 11*d* acquires data about the magnetic attraction F2 corresponding to an input current using an approximate expression prepared for each section.

In this embodiment, an approximate expression for approximating the magnetic attraction F2 in each section is defined as follows:
Section T0: F2=j(I)
Section T1: F2=k(I)
Section T2: F2=l(I)
Section T3: F2=m(I)

The current-dependent parameter component acquisition unit 11*d* acquires data about the magnetic attraction F2 corresponding to the driving current I in a linear motor using an approximate expression for approximating the magnetic attraction F2. Regarding force, the current-dependent parameter component acquisition unit 11*d* acquires data about the force f2 using a defined approximate expression in the same way as that for acquiring data about magnetic attraction.

The total parameter acquisition unit 11*e* acquires a total value about magnetic attraction to be referred to in the motor configuration selection processing (magnetic attraction FA) based on the magnetic attraction F1 acquired by the gap-dependent parameter component acquisition unit 11*c* and the magnetic attraction F2 acquired by the current-dependent parameter component acquisition unit 11*d*.

Specifically, magnetic attraction is expressed as a function of two variables, a gap and a driving current, so that a total value about magnetic attraction (magnetic attraction FA) can be defined as follows:

$$FA=p(x,I)=J \times F1 \times F2 \quad (1)$$

In the formula (1), J is magnetic attraction (fixed value) corresponding to a reference gap.

Likewise, the total parameter acquisition unit 11*e* acquires a total value about force to be referred to in the motor configuration selection processing (force fa) based on the force f1 acquired by the gap-dependent parameter component acquisition unit 11*c* and the force f2 acquired by the current-dependent parameter component acquisition unit 11*d*. Specifically, force is expressed as a function of two variables, a gap and a driving current, so that a total value about force (force fa) can be defined as follows:

$$fa=q(x,I)=T \times f1 \times f2 \quad (2)$$

In the formula (2), T is force (fixed value) corresponding to a reference driving current value.

A condition for a gap and a condition for a driving current are specified by substituting target magnetic attraction or target force (required magnetic attraction or required force) into the left side of the formulas (1) and (2). Further, a condition for a driving current is specified by inputting a target gap. Specifying the driving current in this way makes it possible to specify an amplifier type presented as a result of the motor configuration selection processing.

The selection processing unit 11*f* determines whether a linear motor (a linear motor of a model and specifications input as candidates) is compatible with a condition set by a user based on conditions such as maximum required force, rated force, a gap, a driving voltage, motor arrangement, and a machine condition, and the magnetic attraction FA and the force fa acquired by the total parameter acquisition unit 11*e*. Then, the selection processing unit 11*f* acquires a result of the motor configuration selection processing containing a result of the determination about the compatibility or incompatibility of the linear motor of the model and the specifications input as candidates.

Figure 6:
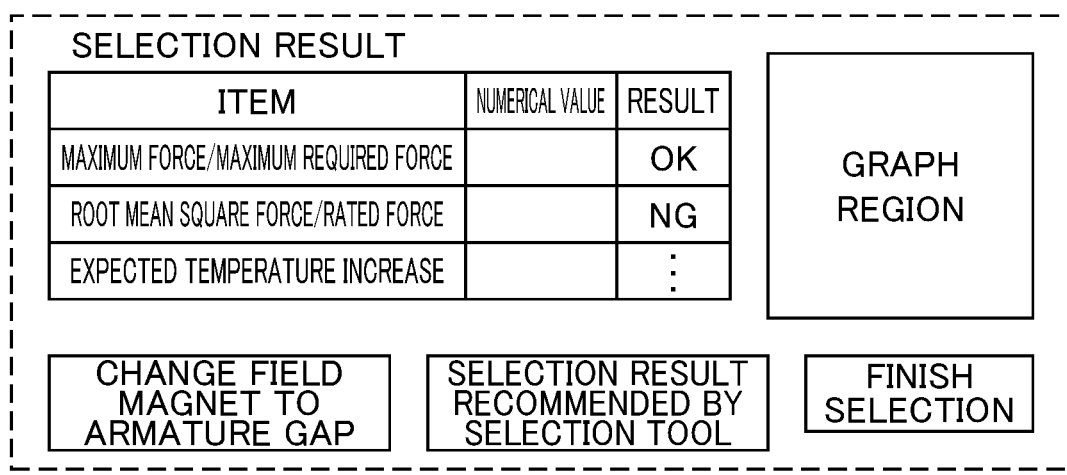
FIG. 6 is a schematic view showing an example of a selection result display screen showing a result of motor configuration selection processing.

FIG. 6 is a schematic view showing an example of a selection result display screen showing a result of the motor configuration selection processing. Referring to FIG. 6, when the selection processing unit 11*f* acquires a result of the motor configuration selection processing, the UI display control unit 11*a* displays the acquired result as the selection result display screen. As shown in FIG. 6, the selection result display screen contains the following displayed in a list form: a value indicating maximum force/maximum required force and a result of determination about compatibility or incompatibility with a selection condition; a value indicating root mean square force/rated force and a result of determination about compatibility or incompatibility with a selection condition; and an expected temperature increase and a result of determination about compatibility or incompatibility with a selection condition. The displayed selection result display screen further contains a graph display region showing the characteristics of a selected linear motor such as speed or force, a button for instructing change in a gap (field magnet to armature gap change button), a button for instructing presentation of a selection result recommended by the motor configuration selection device 1 (selection result button for showing a selection result recommended by a selection tool), and a button for finishing selection of the configuration of a linear motor (selection finish button).

In this embodiment, the selection result display screen in FIG. 6 is displayed in addition to the condition setting screen in FIG. 3 and on the same screen as the condition setting screen. The field magnet to armature gap change button, the selection result button for showing a selection result recommended by the selection tool, and the selection finish button, which are some of items to be displayed on the selection result display screen, are to appear and become capable of being pressed after the foregoing items are displayed in a list form on the selection result display screen.

If the field magnet to armature gap change button is pressed, the UI display control unit 11a highlights the gap item (field magnet to armature gap) in the parameter group C. The field magnet to armature gap change button is a button for performing recalculation to determine how the characteristics of a linear motor to be selected change in response to change in a gap. By inputting a new value to the highlighted gap item (field magnet to armature gap), contents in the selection result display screen are updated. The gap (field magnet to armature gap) accepted in this case is limited within a range between an upper limit and a lower limit not to change the specifications of a linear motor and those of an amplifier.

If the selection result button for showing a selection result recommended by the selection tool is pressed, the selection processing unit 11f searches for a selection achieving the compatibilities of all determination results displayed in a list form on the selection result display screen (a selection making all selection conditions "acceptable"), and presents the searched selection to a user as a recommended selection.

More specifically, the selection processing unit 11f searches for a selection to be recommended by taking the following procedures (1) to (4):

(1) It is determined whether a selection achieving the compatibilities of all determination results is produced only by changing a gap.

(2) If a selection achieving the compatibilities of all determination results is not produced only by changing a gap, a one-size larger linear motor of the same model is selected. Then, the motor configuration selection processing is performed again to make a selection. Initially, the selection is made again through the motor configuration selection processing using a gap (field magnet to armature gap) already input. If a selection achieving the compatibilities of all determination results is not produced, the gap is changed. Then, it is determined whether a selection achieving the compatibilities of all determination results is produced. If it is still impossible to produce a selection achieving the compatibilities of all determination results even with the changed gap, the linear motor is changed to a still one-size larger linear motor. Then, it is determined whether a selection achieving the compatibilities of all determination results is produced. By taking these procedures repeatedly, a gap is changed and a motor size is changed repeatedly and the motor configuration selection processing is performed again to make a selection until a selection achieving the compatibilities of all determination results is produced.

(3) If a selection achieving the compatibilities of all determination results is not produced with the linear motors of the same model, a linear motor of a different model is selected. Then, the motor configuration selection processing is performed again to make a selection. In this case, the selection is made again through the motor configuration selection processing using a gap already input. If multiple selections each achieving the compatibilities of all determination results are specified and determined to be candidates as a result of repeated implementation of the motor configuration selection processing, a candidate minimizing a value about maximum force/maximum required force and a value about root mean square force/rated force is presented in this embodiment. Alternatively, the multiple candidates may be ranked and presented based on corresponding values about maximum force/maximum required force and corresponding values about root mean square force/rated force.

(4) If a selection achieving the compatibilities of all determination results is not produced as a result of making selections through repeated implementation of the motor configuration selection processing using linear motors of all models and using all gap values, an error message is displayed. The displayed error message may be as follows, for example: "No available motor could be found under the input condition. Please reconsider the input condition".

Referring to FIG. 1, the ROM 12 stores various types of system programs written in advance for controlling the motor configuration selection device 1. The RAM 13 is configured using a semiconductor memory such as a dynamic random access memory (DRAM), and stores data to be generated during implementation of various types of processes by the CPU 11. The input unit 14 is configured using an input unit such as a keyboard and a mouse, or a touch sensor. The input unit 14 accepts input of various types of information by a user to the motor configuration selection device 1.

The display unit 15 is configured using a display unit such as a liquid crystal display (LCD), and displays results of various types of processes by the motor configuration selection device 1. The storage unit 16 is configured using a nonvolatile storage unit such as a hard disk or a flash memory, and stores programs, etc. for implementation of the motor configuration selection processing. The storage unit 16 further stores the magnetic attraction data table containing data about a gap and data about the magnetic attraction F1 in association with each other, and a force data table containing data about a gap and data about the force f1 in association with each other.

Referring to FIG. 1, the communication unit 17 includes a communication interface that performs signal processing based on a predetermined communication standard such as a wired or wireless LAN or a USB, for example. The communication unit 17 controls communication of the motor configuration selection device 1 with a different device.

Operation

The operation of the motor configuration selection device 1 will be described next.

Motor Configuration Selection Processing

Figure 7:
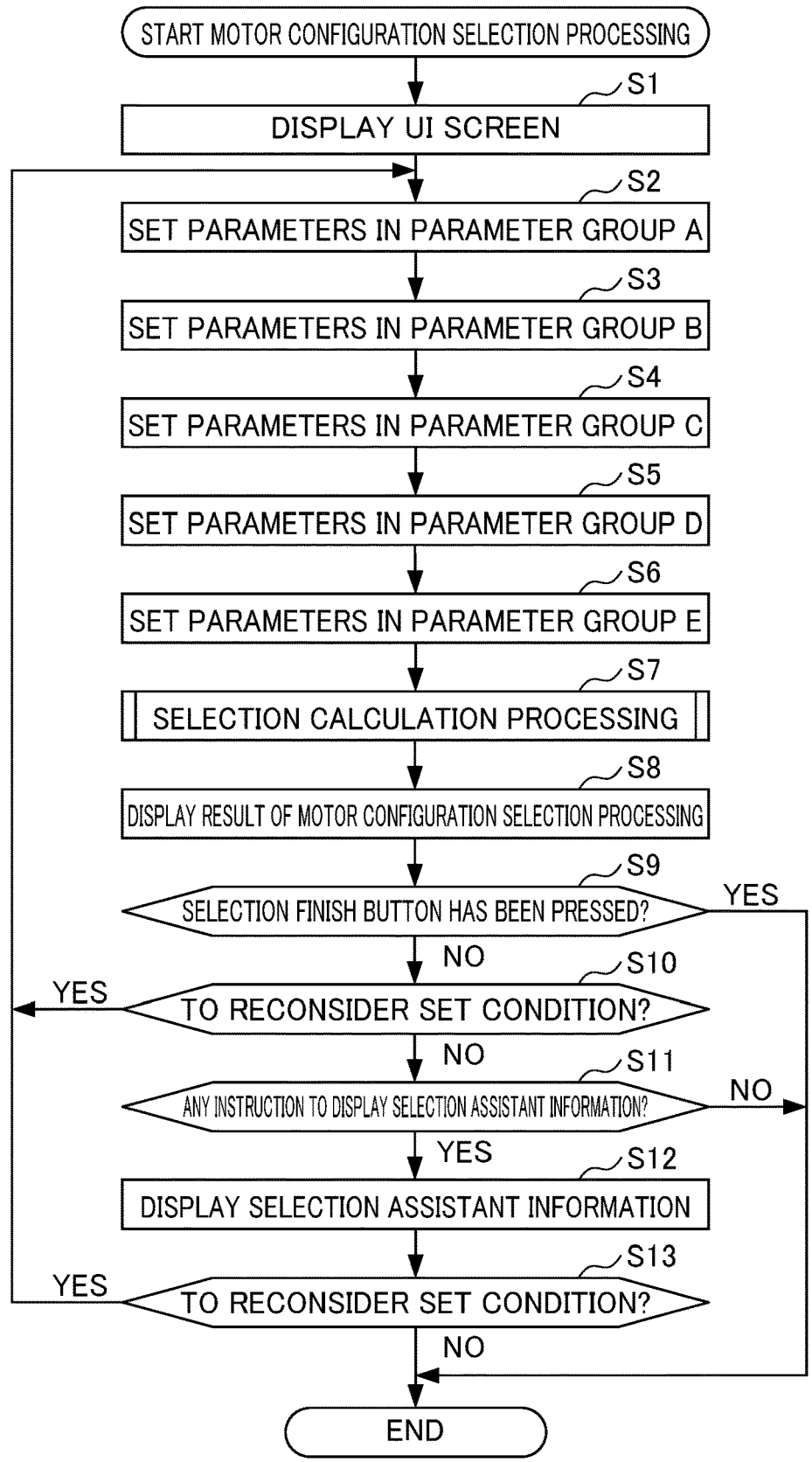
FIG. 7 is a flowchart explaining a flow of the motor configuration selection processing performed by a motor configuration selection device 1.

FIG. 7 is a flowchart explaining a flow of the motor configuration selection processing performed by the motor configuration selection device 1. The motor configuration selection processing is started by input of an instruction to start the motor configuration selection processing input through the input unit 14.

In step S1, the UI display control unit 11a displays a UI screen (condition setting screen) for input and output of various types of information by a user in the motor configuration selection processing. In step S2, the condition setting unit 11b sets the parameters in the parameter group A (arrangement condition, driving voltage, and movement direction) in response to input by the user. In step S1, the user inputs maximum required force and rated force, and these parameters are also set. In step S3, the condition setting unit 11b sets the parameters in the parameter group B (machine conditions (weight of moving object, friction load, and friction coefficient)) in response to input by the user.

In step S4, the condition setting unit 11b sets the parameters in the parameter group C (model name, specifications, etc. of linear motor and gap (field magnet to armature gap)) in response to input by the user. The gap may be input in step S3. In step S5, the condition setting unit 11b sets the parameters in the parameter group D (stroke information (effective stroke and field magnet track length, or field magnet specifications)) in response to input by the user.

In step S6, the condition setting unit 11b sets the parameters in the parameter group E (operation pattern (acceleration, equal speed, or duration of operation such as cutting in seconds)) in response to input by the user. In step S7, selection calculation processing (see FIG. 8) is performed for acquiring various types of parameters to be used in the motor configuration selection processing. In step S8, the UI display control unit 11a displays a result of the motor configuration selection processing acquired by the selection processing unit 11f (selection result display screen).

In step S9, it is determined whether the selection finish button has been pressed on the selection result display screen. If the selection finish button has been pressed on the selection result display screen, a determination indicating YES is made in step S9. Then, the motor configuration selection processing is finished. If the selection finish button has not been pressed on the selection result display screen, a determination indicating NO is made in step S9. Then, the processing goes to step S10.

In step S10, the condition setting unit 11b determines whether an instruction to reconsider the set conditions has been given. The instruction to reconsider the set conditions can be input, for example, by operating a region including an indication "NG" showing a determination result or operating a predetermined button (a button icon for instructing resetting, for example) on the selection result display screen. If the instruction to reconsider the set conditions has been given, a determination indicating YES is made in step S10. Then, the processing goes to step S2. If the user inputs a parameter directly to an item as a target of re-entry of a parameter on the condition setting screen displayed together with the selection result display screen, for example, the processing may directly go to a step corresponding to setting of the input parameter. If the instruction to reconsider the set conditions has not been given, a determination indicating NO is made in step S10. Then, the processing goes to step S11.

In step S11, the selection processing unit 11f determines whether an instruction to display information for assisting in selection of the configuration of a linear motor (hereinafter also called "selection assistant information") has been given. In this embodiment, information to be provided as the selection assistant information is a selection achieving the compatibilities of all determination results or a past selection result selected under similar conditions (a selection history of the configuration of a linear motor) searched for by the selection processing unit 11f as a result of press of the selection result button for showing a selection result recommended by the selection tool. The user selects one of these pieces of information to be displayed. If the instruction to display the selection assistant information has been given, a determination indicating YES is made in step S11. Then, the processing goes to step S12. If the instruction to display the selection assistant information has not been given, a determination indicating NO is made in step S11. Then, the motor configuration selection processing is finished.

In step S12, the selection processing unit 11f displays the selection assistant information. In step S13, the condition setting unit 11b determines whether an instruction to reconsider the set conditions has been given. The instruction to reconsider the set conditions can be input, for example, by operating a region including an indication "NG" showing a determination result or operating a predetermined button (a button icon not shown in the drawings for instructing resetting, for example) on the selection result display screen. If the instruction to reconsider the set conditions has been given, a determination indicating YES is made in step S13. Then, the processing goes to step S2. If the user inputs a parameter directly to an item as a target of re-entry of a parameter on the condition setting screen displayed together with the selection result display screen, for example, the processing may directly go to a step corresponding to setting of the input parameter. If the instruction to reconsider the set conditions has not been given, a determination indicating NO is made in step S13. Then, the motor configuration selection processing is finished.

Figure 8:
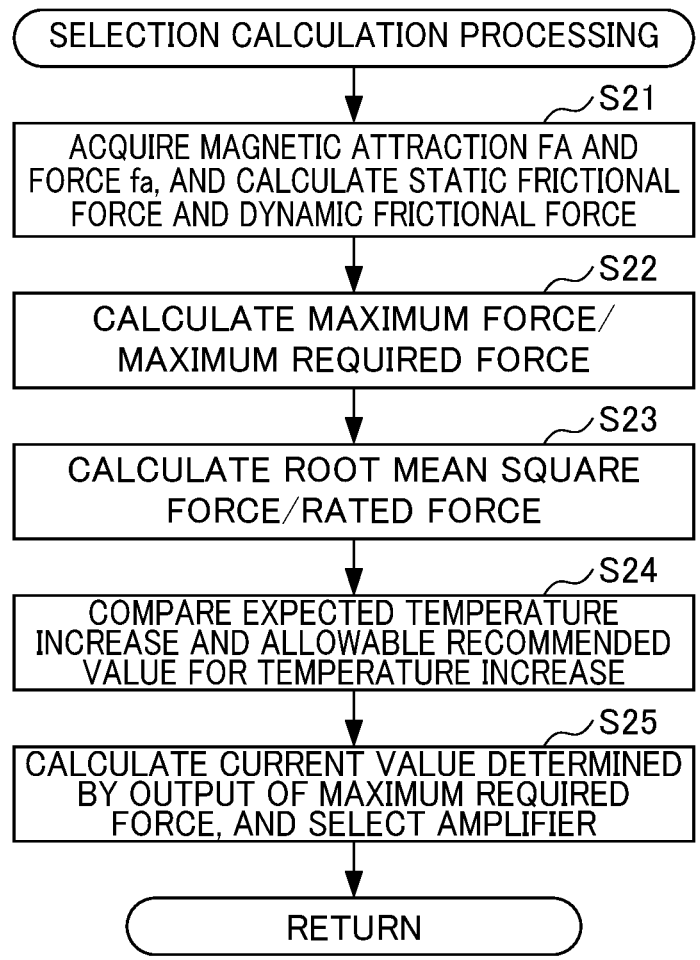
FIG. 8 is a flowchart explaining a flow of selection calculation processing performed in step S7 of the motor configuration selection processing.

The selection calculation processing performed in step S7 of the motor configuration selection processing will be described next. FIG. 8 is a flowchart explaining a flow of the selection calculation processing performed in step S7 of the motor configuration selection processing. In step S21, the total parameter acquisition unit 11e acquires a total value about magnetic attraction to be referred to in the motor configuration selection processing (magnetic attraction FA) based on the magnetic attraction F1 acquired by the gap-dependent parameter component acquisition unit 11c and the magnetic attraction F2 acquired by the current-dependent parameter component acquisition unit 11d. Further, the total parameter acquisition unit 11e acquires a total value about force to be referred to in the motor configuration selection processing (force fa) based on the force f1 acquired by the gap-dependent parameter component acquisition unit 11c and the force f2 acquired by the current-dependent parameter component acquisition unit 11d. Further, the selection processing unit 11f calculates the static frictional force and dynamic frictional force of a linear motor to be selected based on a friction coefficient, etc. input on the condition setting screen.

In step S22, the selection processing unit 11f calculates maximum force/maximum required force, and stores the calculated maximum force/maximum required force as internal data. In step S23, the selection processing unit 11f calculates root mean square force/rated force, and stores the calculated root mean square force/rated force as internal data. In step S24, the selection processing unit 11f compares an expected temperature increase estimated based on a temperature increase in the selected linear motor and an allowable recommended value for temperature increase, and stores a result of the comparison as internal data.

In step S25, a current value determined by output of maximum required force corresponding to the input gap is calculated, an appropriate amplifier is selected, and a result of the selection is stored as internal data. After step S25, the flow returns to the motor configuration selection processing.

As described above, in the motor configuration selection device 1 according to this embodiment, regarding a target configuration of a linear motor, the compatibility or incompatibility of a selection with required specifications is determined by reflecting influence caused by a gap between a field magnet and an armature in the linear motor as well as influence caused by a combination of components such as the lengths of field magnets or the number of the field magnets, for example. The gap between the field magnet and the armature in the linear motor is influenced by a use condition under which a user of the linear motor actually uses the linear motor. Influence on the performance of the linear motor caused by change in the gap is an important criterion for selecting the configuration of the linear motor. Thus, by determining the compatibility or incompatibility of a selection including a gap-dependent parameter with required specifications, the motor configuration selection device 1 becomes capable of selecting the configuration of a linear motor compatible with a set condition. By doing so, the configuration of a linear motor can be selected more appropriately.

The motor configuration selection device 1 generates an approximate expression for approximating magnetic attraction or force corresponding to a gap based on a representative value stored in the magnetic attraction data table or the force data table, and calculates the magnetic attraction or force corresponding to the gap using the generated approximate expression. This allows calculation of more appropriate magnetic attraction or force corresponding to a gap other than the representative value. The approximate expression may be generated in advance and held in the motor configuration selection device 1, and may be used in calculation of magnetic attraction or force corresponding to a gap other than the representative value. In this case, the process of generating an approximate expression is omissible, so that magnetic attraction or force can be calculated more easily.

First Modification

In the example described in the foregoing embodiment, an approximate expression for approximating magnetic attraction or force corresponding to a gap is generated based on a representative value stored in the magnetic attraction data table or the force data table, or such an approximate expression is generated in advance and held in the motor configuration selection device 1. In addition to this configuration, an approximate expression to be used for approximating magnetic attraction or force corresponding to a gap may be selected from an approximate expression held in advance in association with the magnetic attraction data table or the force data table, and an approximate expression generated by making estimation through the least-squares method, for example, based on data about a representative value stored in the magnetic attraction data table or the force data table, as described above. In this case, the gap-dependent parameter component acquisition unit 11c may determine which one of the approximate expressions is to be used in response to a condition during calculation of data about magnetic attraction or data about force using an approximate expression, and may use the approximate expression determined to be most appropriate. For example, a point may be given to the order of approximation (approximation accuracy) of an approximate expression and each factor as calculation load on the gap-dependent parameter component acquisition unit 11c. Further, a factor to be given greater importance may be weighted so as to increase a coefficient. Then, an approximate expression to be used may be determined based on a total of points given to each weighted factor. In this way, a gap-dependent parameter component (magnetic attraction or force) can be calculated by selecting a more appropriate approximate expression.

The present invention is not limited to the foregoing embodiment and modification but can be changed, modified, etc. in various ways. For example, in the foregoing embodiment and modification, an approximate expression for approximating magnetic attraction or force corresponding to a gap is generated or held in various ways. An approximate expression for approximating magnetic attraction or force corresponding to a driving current can also be generated or held in various ways.

The function of the motor configuration selection device 1 of the foregoing embodiment can be realized entirely or partially by hardware, by software, or by a combination of hardware and software. Being realized by software means being realized by reading and execution of a program by a processor. To configure the motor configuration selection device 1 by hardware, the function of the motor configuration selection device 1 can be configured partially or entirely using an integrated circuit (IC) such as an application specific integrated circuit (ASIC), a gate array, a field-programmable gate array (FPGA), or a complex programmable logic device (CPLD), for example.

The function of the motor configuration selection device 1 can also be configured entirely or partially by software in a computer including a storage unit such as a hard disk or a ROM storing programs describing all or part of the operation of the motor configuration selection device 1, a DRAM storing data required for calculation, a CPU, and a bus for connection between the units. In this computer, the function of the motor configuration selection device 1 can be realized by storing information necessary for calculation into the DRAM, and making the CPU execute the programs.

These programs can be stored in various types of computer-readable media and can be supplied to the computer. The computer-readable media include various types of tangible storage media. Examples of the computer-readable media include a magnetic recording medium (a flexible disk, magnetic tape, or a hard disk drive, for example), a magneto-optical recording medium (a magneto-optical disk, for example), a CD read-only memory (CD-ROM), a CD-R, a CD-R/W, a digital versatile disk ROM (DVD-ROM), a DVD-R, a DVD-R/W, and a semiconductor memory (a mask ROM, a programmable ROM (PROM), an erasable PROM (EPROM), a flash memory, or a random access memory (RAM), for example). These programs may be distributed by being downloaded onto a computer of a user through a network.

While the embodiment of the present invention has been described in detail above, this embodiment is merely a specific example employed for implementing the present invention. The technical scope of the present invention is not limited to the above-described embodiment. Various changes of the present invention can be devised within a range not departing from the substance of the invention. These changes are also covered by the technical scope of the present invention.

EXPLANATION OF REFERENCE NUMERALS

1 Motor configuration selection device
11 CPU
11a UI display control unit
11b Condition setting unit (compatibility condition setting unit)
11c Gap-dependent parameter component acquisition unit (characteristic calculation unit)
11d Current-dependent parameter component acquisition unit (characteristic calculation unit)
11e Total parameter acquisition unit (characteristic calculation unit)
11f Selection processing unit (condition determination unit)
12 ROM
13 RAM
14 Input unit
15 Display unit
16 Storage unit
17 Communication unit
22 Field magnet
32 Armature
G Gap

What is claimed is:

1. A motor configuration selection device comprising a characteristic calculation unit that calculates at least one of force and magnetic attraction to be achieved by a component as a candidate for selection in a linear motor based on a gap between a field magnet and an armature in the linear motor to be selected,
wherein the characteristic calculation unit has an option between a first approximate expression and a second approximate expression, the first approximate expression being held in association with a representative value about force or magnetic attraction corresponding to the gap between the field magnet and the armature in the linear motor to be selected, the second approximate expression being an approximate expression for approximating force or magnetic attraction corresponding to the gap between the field magnet and the armature in the linear motor to be selected and being generated based on a representative value about the force or the magnetic attraction, the characteristic calculation unit selecting one of the first approximate expression and the second approximate expression based on approximation accuracy, a factor as calculation load, and a weight given in advance to the factor, and calculating the force or the magnetic attraction.

2. The motor configuration selection device according to claim 1, comprising: a compatibility condition setting unit that sets a compatibility condition including at least one of required force and required magnetic attraction in the linear motor; and
a condition determination unit that determines the compatibility or incompatibility of at least one of the force and the magnetic attraction calculated by the characteristic calculation unit based on the compatibility condition set by the compatibility condition setting unit.

3. The motor configuration selection device according to claim 1, wherein the characteristic calculation unit calculates at least one of the force and the magnetic attraction to be achieved by the component as the candidate for selection in the linear motor based on the gap between the field magnet and the armature in the linear motor to be selected and a current in the linear motor to be selected.

4. The motor configuration selection device according to claim 1, wherein the characteristic calculation unit calculates the force or the magnetic attraction to be achieved by the component as the candidate for selection in the linear motor based on an approximate expression for approximating force corresponding to the gap between the field magnet and the armature in the linear motor to be selected, or an approximate expression for approximating magnetic attraction corresponding to the gap between the field magnet and the armature in the linear motor to be selected.

5. The motor configuration selection device according to claim 4, wherein the characteristic calculation unit generates the approximate expression for approximating the force or the approximate expression for approximating the magnetic attraction based on a representative value about the force or the magnetic attraction corresponding to the gap between the field magnet and the armature in the linear motor to be selected.

6. A motor configuration selection method comprising a characteristic calculation step of calculating at least one of force and magnetic attraction to be achieved by a component as a candidate for selection in a linear motor based on a gap between a field magnet and an armature in the linear motor to be selected,
wherein, in the characteristic calculation step, there is an option between a first approximate expression and a second approximate expression, the first approximate expression being held in association with a representative value about force or magnetic attraction corresponding to the gap between the field magnet and the armature in the linear motor to be selected, the second approximate expression being an approximate expression for approximating force or magnetic attraction corresponding to the gap between the field magnet and the armature in the linear motor to be selected and being generated based on a representative value about the force or the magnetic attraction, the characteristic calculation step further comprising selecting one of the first approximate expression and the second approximate expression based on approximation accuracy, a factor as calculation load, and a weight given in advance to the factor, and calculating the force or the magnetic attraction.

7. A program that causes a computer to fulfill a characteristic calculation function of calculating at least one of force and magnetic attraction to be achieved by a component as a candidate for selection in a linear motor based on a gap between a field magnet and an armature in the linear motor to be selected
wherein, when fulfilling the characteristic calculation function, there is an option between a first approximate expression and a second approximate expression, the first approximate expression being held in association with a representative value about force or magnetic attraction corresponding to the gap between the field magnet and the armature in the linear motor to be selected, the second approximate expression being an approximate expression for approximating force or magnetic attraction corresponding to the gap between the field magnet and the armature in the linear motor to be selected and being generated based on a representative value about the force or the magnetic attraction, and one of the first approximate expression and the second approximate expression is selected based on approximation accuracy, a factor as calculation load, and a weight given in advance to the factor, and the force or the magnetic attraction is calculated.

8. The program of claim 7, wherein the program is stored on a non-transitory computer-readable medium.

* * * * *